O. E. MICHAUD.
ANTIFRICTION BEARING.
APPLICATION FILED SEPT. 25, 1913.
1,165,432.
Patented Dec. 28, 1915.
2 SHEETS—SHEET 1.
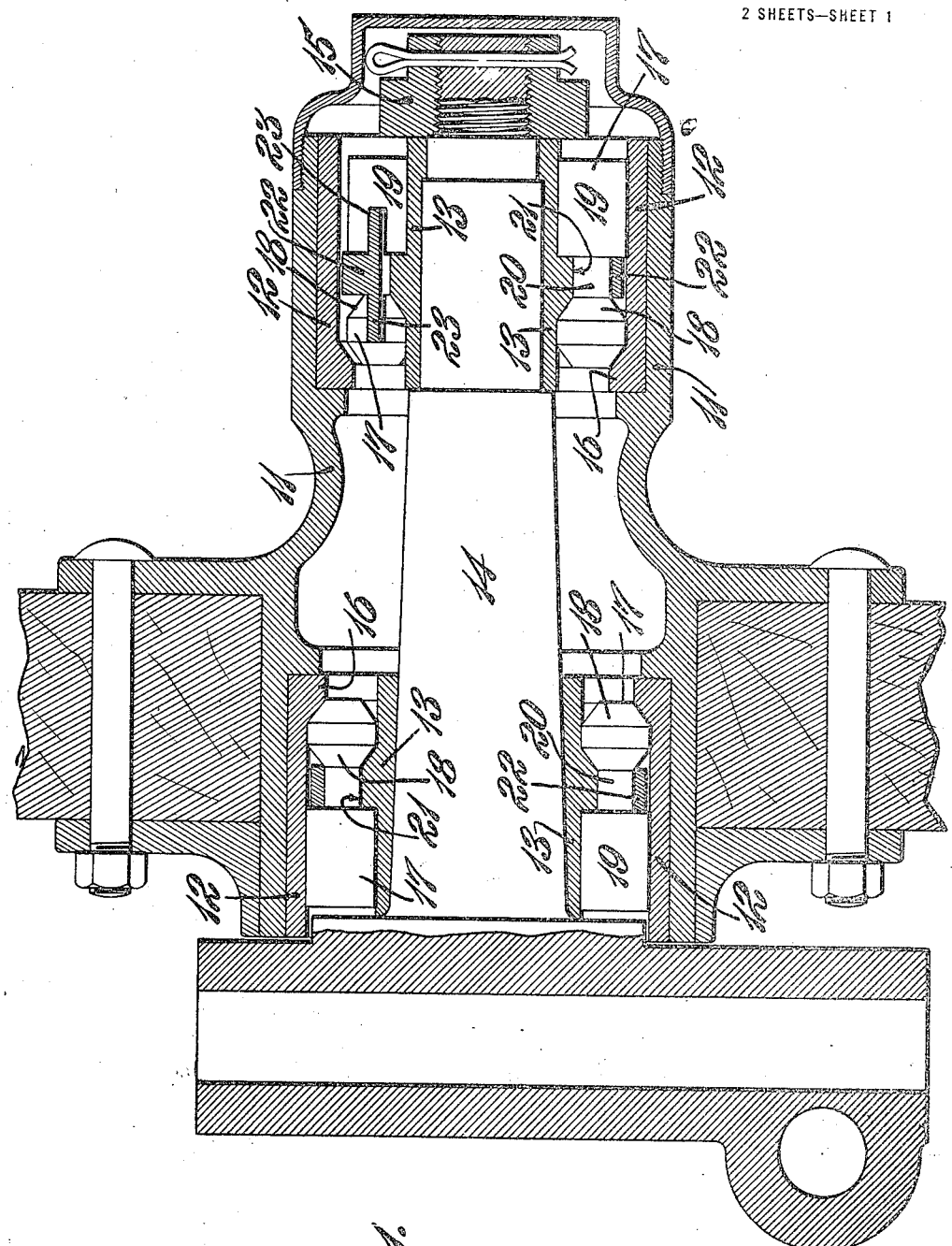

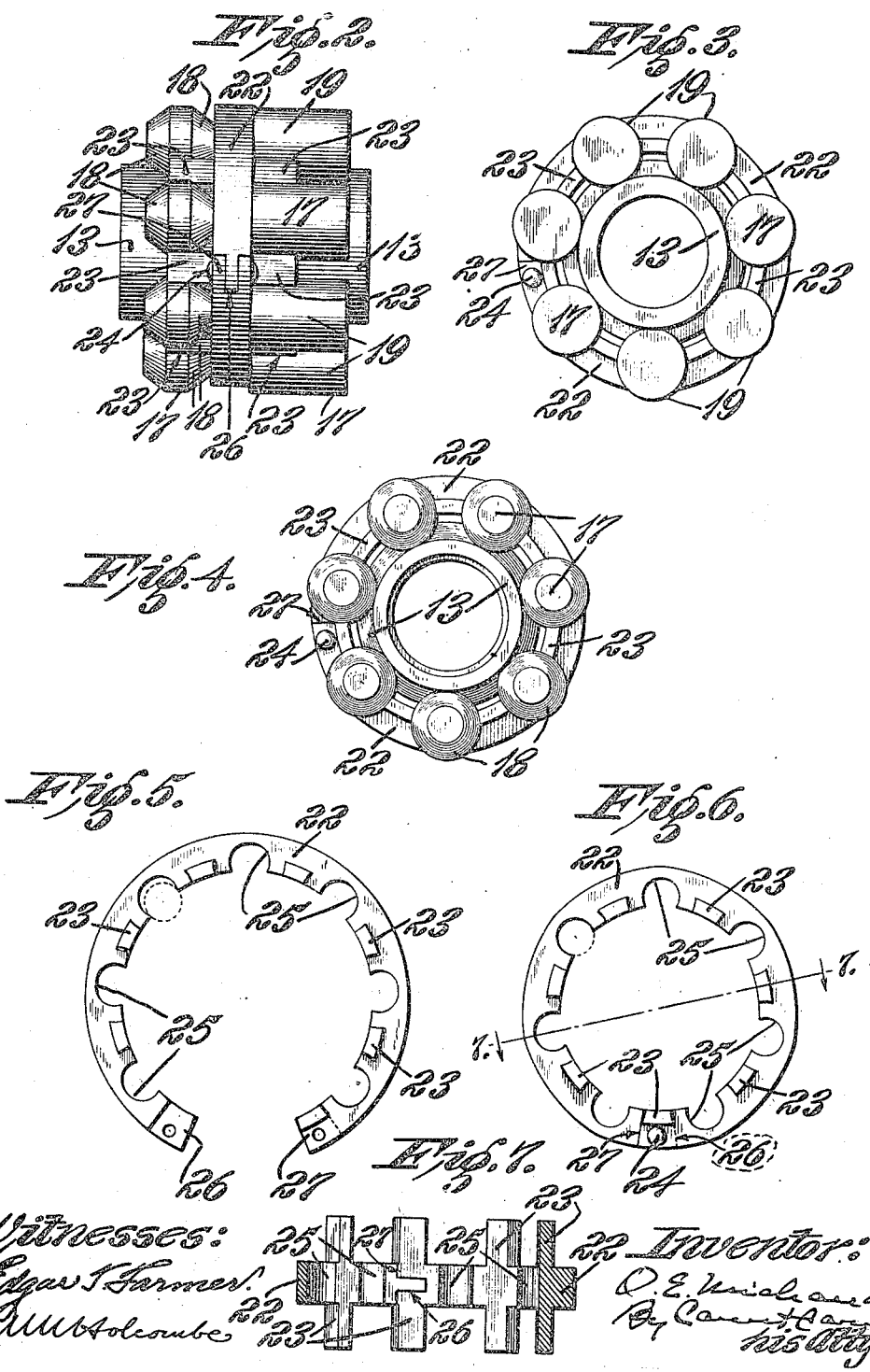

UNITED STATES PATENT OFFICE.

ONESIME E. MICHAUD, OF ST. LOUIS, MISSOURI.

ANTIFRICTION-BEARING.

1,165,432.  Specification of Letters Patent.  Patented Dec. 28, 1915.

Application filed September 25, 1913. Serial No. 791,684.

*To all whom it may concern:*

Be it known that I, ONESIME E. MICHAUD, a citizen of the United States, and a resident of the city of St. Louis and State of Missouri, have invented a new and useful Improvement in Antifriction-Bearings, of which the following is a specification.

This invention relates to combined radial and thrust antifriction bearings of the type wherein a series of cylindrical or conical rollers are spaced circumferentially between inner and outer concentric bearing rings, the rollers being held in alinement at equal distances apart by means of an annular spacing member.

The object of the invention is to simplify bearings of this type.

Another object of the invention is to reduce the tendency of end thrust to twist the rollers out of alinement; and a further object of the invention is to make the roller spacing member serve also as a roll retaining member whenever one or both bearing rings are removed.

Further objects of the invention appear more fully in connection with the description of the embodiments thereof shown in the accompanying drawing, and the invention itself is more particularly pointed out in the claims.

In the drawings, in which the same reference characters are used in the several views to designate the same parts, respectively, Figure 1 is a central longitudinal sectional view of the hub of a wheel fitted with bearings embodying this invention; Fig. 2 is a side elevation of the inner bearing ring, rollers and retaining ring in assembled position; Figs. 3 and 4 are end elevations of the same, looking from opposite ends; Fig. 5 is a side view of a split roller retaining ring prior to being assembled with the bearing and rollers; Fig. 6 is a side view of the same after it has been sprung together and riveted; and Fig. 7 is a cross section of the same on the line 7—7 in Fig. 6.

Referring to Fig. 1 of the drawings, the wheel hub 11 is bored out at its two ends to receive the outer bearing rings 12 of two antifriction roller bearings. The inner bearing rings 13 of these antifriction roller bearings are slipped on to the said spindle 14. The spindle is tapered slightly away from its outer end, and the inner ring of the inner bearing is seated thereon. Near the outer end of the spindle is a straight shouldered portion on which the inner bearing ring of the outer bearing is seated. A nut 15 mounted on the threaded end of the spindle retains the outer bearing in position on the spindle.

Each outer bearing ring 12 has an internal flange 16 at the end which bears against the end of the bore in which it is seated, the face of this flange toward the bearing surface of the ring being beveled at an angle of about 45 degrees. The rollers 17 each have one of their ends beveled at the same angle as the beveled ring. Grooves are cut in the rollers near their beveled ends, the sides of the grooves next the beveled ends of the rollers being beveled at an angle of about 45 degrees. These grooves divide the rollers into beveled portions 18 and cylindrical portions 19, connected by necks 20. The rollers 17 are arranged in a circular series around an inner bearing ring 13 with their axes parallel to the axis of the bearing ring. The cylindrical portions 19 carry the radial load imposed upon the bearing.

The inner bearing rings 13 have flanges 21 on their outer surfaces which fit in the grooves in the rollers. One face of the flange 21 is beveled at the same angle as the beveled sides of the grooves, and in assembling the rollers on the inner ring the beveled sides of the grooves are placed against the beveled face of the flange. The beveled faces of the flanges 16 and 21 resist endwise movement of the rollers with respect to the bearing rings and thereby transmit axial pressure or side thrust on the wheel to the axle spindle. The cylindrical portions of the rollers between the beveled ends and grooves thereof assist in carrying the radial load on the bearing due to the weight on the wheel.

Surrounding the series of rollers and positioned in the grooves between the bearing portions is an annular spacing and retaining member 22, having slightly more than semicircular recesses 25 on its inner face closely fitting and embracing the outer halves of the necks 20 of the rollers, which are sprung in place therein. The width of the retaining member is the same as the width of the grooves in the rollers, thereby both spacing the rolls and maintaining them in parallel alinement with the bearing rings. The inner ring 13 coöperates with the retaining member 22, to retain the rollers in assembled position, thereby preventing the latter from springing out of the grooves.

The sides of the retaining member 22 are formed with lateral wings 23 which fit between adjacent rollers and maintain them in parallel relation. The rollers are assembled in the ring as hereinafter described and rollers and ring together are slipped over the flange 21 upon the end of the inner bearing ring. The retaining ring 22 is split at one point on its periphery, and when assembled with the rollers on the inner ring its ends are secured together by a rivet 24 or any suitable means.

The retaining ring 22 is formed initially as a segment of a larger ring, the notches 25 being spaced around its inner periphery at their proper ultimate distance apart, as shown in Fig. 5. The ends 26, 27 of the segmental ring are tongued and grooved to mate together, and alining holes are drilled for a rivet 24. The shape of the notches 25 is made originally that of an ellipse or a non-cylindrical segmental curve, and the gap across its mouth is just wide enough to admit the neck of a roller. When the ends of the retaining ring are brought together, the corners of the notches are contracted about the necks 20 to embrace and retain the rollers in position, as shown in Fig. 6. This construction provides a very secure retaining means for the rollers, and does not necessitate deforming the rolls in order to assemble them therein.

It is evident that departure from the shape and dimensions of the parts herein shown may be made without materially altering the invention, and the invention is not restricted to the shapes and relative sizes of the parts as shown in the drawings.

What I claim as my invention is as follows:

1. A combined radial and end thrust antifriction bearing comprising a spindle, a shell surrounding said spindle and provided with outer bearing rings having inclined bearing surfaces oppositely arranged in respect to each other, inner bearing rings on said spindle having circumferential ridges provided with inclined bearing surfaces, said inclined bearing surfaces on said inner bearing rings facing each other and being spaced apart a distance greater than the distance between the inclined bearing surfaces of the outer bearing rings, means for holding said bearing rings from endwise movement, and two series of circularly spaced rollers between said bearing rings, said rollers having beveled ends and beveled grooves forming necks coöperating with the oppositely disposed inclined portions of said bearing rings, and means wholly contained in the space between said rollers embracing the necks of said rollers and maintaining them in their parallel relationship.

2. A combined radial and thrust antifriction bearing comprising a spindle, a shell surrounding said spindle and having end bores, outer bearing rings in said shell, the inner ends of said outer bearing rings abutting against the ends of said bores, inner bearing rings on said spindle, said inner bearing rings being held against movement away from each other, said outer bearing rings having internal flanges on their ends adjacent the inner ends of said bores, said internal flanges having bearing surfaces facing outward, said inner bearing rings having external flanges intermediate the ends thereof, said external flanges having bearing surfaces facing inward, two series of circular spaced rollers between said bearing rings, said rollers being grooved to receive the flanges on said inner bearing rings, and the heads formed at the inner ends of said rollers by said grooves bearing at their ends against said internal flanges on said outer bearing rings and said external flanges on said inner bearing rings, respectively.

3. A combined radial and thrust antifriction bearing comprising a spindle, a shell surrounding said spindle and having end bores, outer bearing rings in said shell, the inner ends of said outer bearing rings abutting against the ends of said bores, inner bearing rings on said spindle, said inner bearing rings being held against movement away from each other, said outer bearing rings having beveled internal flanges on their ends adjacent the inner ends of said bores, said inner bearing rings having beveled external flanges the beveled faces of said internal flanges and said external flanges facing each other near corresponding ends of the bearing rings, two series of circularly spaced beveled rollers between said bearing rings, said rollers being grooved to receive the beveled flanges on said inner bearing rings, and the inner ends of said rollers bearing against said beveled internal flanges on said outer bearing rings, and means embracing the grooved portions of said rollers whereby the latter are maintained in parallel relationship.

4. A roller for an antifriction bearing, said roller having two cylindrical bearing portions of the same diameter at its extreme ends connected by a neck portion of less diameter, one of said cylindrical portions being relatively short and having oppositely disposed beveled end thrust bearing faces.

5. A combined radial and thrust antifriction bearing comprising concentrically arranged inner and outer bearing rings having cylindrical bearing surfaces, each of said rings having an annular flange projecting into the space between them, said flanges being provided with conical bearing surfaces spaced apart axially and facing each other, a series of parallel grooved rollers spaced around between said rings with their grooves straddling one of said annular flanges, the heads formed on said rollers by said grooves having thrust bearing surfaces at each end coöperating with the bearing surfaces of said annular flanges, the respective lines of thrust on the bearings at each end of each of said heads being in substantial alinement.

6. A combined radial and thrust antifriction bearing comprising concentrically arranged inner and outer bearing rings having cylindrical bearing surfaces, each of said rings having an annular flange projecting into the space between them, said flanges being provided with bearing surfaces spaced apart axially and facing each other, a series of parallel grooved rollers spaced around between said rings with their grooves straddling one of said annular flanges, the heads formed on said rollers by said grooves having thrust bearing surfaces at each end coöperating with the bearing surfaces of said annular flanges, the axial distance between said bearing surfaces being short whereby the tendency of the end thrust on the rollers to twist them out of parallel is reduced.

Signed at St. Louis, Missouri, this 20th day of September, 1913.

ONESIME E. MICHAUD.

Witnesses:
   EDGAR T. FARMER,
   M. A. SHELTON.